United States Patent
Grab (10) Patent No.: US 7,460,668 B2
(45) Date of Patent: Dec. 2, 2008

(54) OPTIMIZED SECURE MEDIA PLAYBACK CONTROL

(75) Inventor: Eric William Grab, San Diego, CA (US)

(73) Assignee: DivX, Inc., San Diego, CA (US)

( * ) Notice: Subject to any disclaimer, the term of this patent is extended or adjusted under 35 U.S.C. 154(b) by 685 days.

(21) Appl. No.: 10/895,355

(22) Filed: Jul. 21, 2004

(65) Prior Publication Data

US 2006/0020825 A1 Jan. 26, 2006

(51) Int. Cl.
*H04L 9/00* (2006.01)
*H04N 7/167* (2006.01)

(52) U.S. Cl. .......................... 380/240; 713/171; 726/27
(58) Field of Classification Search .................. 380/240
See application file for complete search history.

(56) References Cited

U.S. PATENT DOCUMENTS

| | | | |
|---|---|---|---|
| 5,509,070 A | | 4/1996 | Schull |
| 5,754,648 A | * | 5/1998 | Ryan et al. .................. 380/201 |
| 5,892,900 A | | 4/1999 | Ginter et al. |
| 6,175,921 B1 | | 1/2001 | Rosen |
| 6,466,671 B1 | * | 10/2002 | Maillard et al. ............. 380/227 |
| 2002/0051494 A1 | | 5/2002 | Yamaguchi et al. |
| 2002/0110193 A1 | | 8/2002 | Yoo et al. |
| 2003/0001964 A1 | | 1/2003 | Masukura et al. |
| 2003/0035488 A1 | | 2/2003 | Barrau |
| 2003/0093799 A1 | | 5/2003 | Kauffman et al. |
| 2003/0185542 A1 | | 10/2003 | McVeigh et al. |

OTHER PUBLICATIONS

International Search Report for International Application No. PCT/US2005/025845 filed Jul. 21, 2005, report completed Feb. 5, 2007 and mailed May 10, 2007, 3 pgs.
Written Opinion for International Application No. PCT/US2005/025845 filed Jul. 21, 2005, report completed Feb. 5, 2007 and mailed May 10, 2007, 5 pgs.
Darek Blasiak, Ph.D., "Video Transrating and Transcoding: Overview of Video Transrating and Transcoding Technologies," Ingenient Technologies, TI Developer Conference, Aug. 6-8, 2002, 22 pgs.
Mark Nelson, "Arithmetic Coding +Statistical Modeling=Data Compression: Part 1—Arithmetic Coding," Doctor Dobb's Journal, Feb. 1991, printed form http://www.dogma.net/markn/articles/arith/part1.htm; printed Jul. 2, 2003, 12 pages.
Author Unknown, "Entropy and Source Coding (Compression)," TCOM 570, 1999-9, pp. 1-22.
Nam Phamdo, "Theory of Data Compression," printed from http://www.data-compression.com/theory.html on Oct. 10, 2003, 12 pgs.
Author Unknown, "MPEG-4 Video Encoder: Based on International Standard ISO/IEC 14496-2," Patni Computer Systems, Ltd., publication date unknown, 15 pgs.

* cited by examiner

*Primary Examiner*—Matthew Heneghan
(74) *Attorney, Agent, or Firm*—Kauth, Pomeroy, Peck & Bailey LLP (57) ABSTRACT

A media player manages and controls rights to playback of media content by the media player, which stores, during a registration process in which the media player need not be connected to an external computing system, information used by the media player to control playback. A minimal amount of the media player's memory is used to store the information used to control playback.

21 Claims, 12 Drawing Sheets

| ITEM | LENGTH (BYTES) | |
|---|---|---|
| GUARD | 3 BYTES | |
| KEY | 16 BYTES | |
| IDENTIFIER | 5 BYTES | |
| 0 SERIAL NO. | 2 BYTES | |
| 0 COUNTER | 1 BYTE | |
| 1 SERIAL NO. | 2 BYTES | |
| 1 COUNTER | 1 BYTE | |
| 2 SERIAL NO. | 2 BYTES | |
| 2 COUNTER | 1 BYTE | 48 BYTES |
| 3 SERIAL NO. | 2 BYTES | |
| 3 COUNTER | 1 BYTE | |
| 4 SERIAL NO. | 2 BYTES | |
| 4 COUNTER | 1 BYTE | |
| 5 SERIAL NO. | 2 BYTES | |
| 5 COUNTER | 1 BYTE | |
| 6 SERIAL NO. | 2 BYTES | |
| 6 COUNTER | 1 BYTE | |
| 7 SERIAL NO. | 2 BYTES | |
| 7 COUNTER | 1 BYTE | |

OPTIMIZED SECURE MEDIA PLAYBACK CONTROL

BACKGROUND OF THE INVENTION

1. Field of the Invention

The present invention relates to managing rights to playback of media content by a player, and more particularly to a system, method and apparatus for managing the rights to playback of media content on a standalone player, such as a player that is currently not connected to a media control server, based on playback control information stored in memory of the player.

2. Description of the Related Art

With an increasing popularity of electronic distribution of media content for playback by a consumer electronic device, such as a digital versatile disc (DVD) player or an audio player, there is an increased need to be able to protect the electronically-distributed media content from unauthorized use.

Some conventional approaches for protecting digitally-distributed content on a player require that the player be networked to a server which provides the media content, contain a secure internal clock, and/or be configured with a significant amount of dedicated memory. These approaches are cumbersome and/or add additional expense to the manufacture of the player.

More particularly, a server may be used to download a key directly to the player so that the player is able to decrypt encrypted media content before playing the content. However, the player is typically mobile such as a handheld player or is in a location where there is no easy access to a network connection (i.e., phone line or ethernet connection). Accordingly, requiring the player to be connected to a server is at the very least cumbersome and may even be prohibitive.

Consideration must also be given to the cost of manufacturing a player. Typically, players are mass produced embedded systems, which are not uniquely identifiable without additional expense, making it difficult to restrict playback to a particular player. In addition, in order to maintain a competitiveness, a manufacturer is reluctant to add extra components to the player thereby increasing the cost of manufacturing the players.

Thus, manufacturers are reluctant to add memory and/or a secure clock, for example, since such an addition would increase the manufacturing costs. A conventional approach which uses a clock to determine an expiration of digital rights is undesirable, since the clock would add to the cost of manufacturing the player. Similarly, since each non-volatile memory module included in a player adds to the cost of the player, a manufacturer is reluctant to increase the amount of memory used in the player.

The conventional approaches are therefore cumbersome to use and/or are prohibitive, or they may even require modifications to the players that would increase manufacturing costs.

SUMMARY OF THE INVENTION

The present invention addresses difficulties and drawbacks of managing rights for use in playback of media content by a player by providing a system, method and/or apparatus for configuring the player to store an encryption key and an identifier associated with the encryption key, and using an encryption key stored in the player's memory and identified using an identifier stored with encrypted media content to decrypt the content.

More particularly, using information provided by the player, a user obtains configuration information which is in turn input to the player. The configuration information can be input to the player using a removable storage media inserted in the player. A portion of the configuration information, including an encryption key and an associated identifier, is stored in the player's memory.

Thereafter, an identifier stored with the media content is accessed and used by the player to retrieve the stored encryption key. The encryption key is used by the player to decrypt encrypted media content.

Advantageously, using playback control according to the present invention, there is no requirement for the player to be connected to a network. In addition, no specialized components are needed in the player.

According to the present invention, a method is defined for configuring a media player to manage rights to playback of media content, the media player randomly-generating and pre-storing a stored guard. The method comprises providing registration information including the stored guard, the registration information for use in generating configuration information, receiving the configuration information, which includes a guard, an encryption key and an associated identifier identifying the encryption key, and storing the encryption key and the associated identifier in memory of the player in a case that the received guard is determined to match the stored guard.

In another aspect of the invention, a method is defined of managing rights to playback of media content by a media player which stores an encryption key and an identifier associated with the encryption key. The method comprising receiving media content and an identifier stored with the media content, retrieving from memory of the player an encryption key having an associated identifier matching the received identifier, and decrypting the media content using the retrieved encryption key.

According to another aspect of the invention, a method is defined for configuring a media player which randomly-generates and pre-stores a stored guard, a configured media player managing rights to playback of media content by the media player. The method comprising providing registration information for use in generating configuration information, the registration information including the stored guard, receiving the configuration information which includes a guard, an encryption key and an associated identifier identifying the encryption key, the encryption key and the associated identifier are stored in the media player's memory in a case that the received guard matches the stored guard, and retrieving from the player's memory an encryption key for use in decrypting the media content, the retrieved encryption key having an associated identifier determined to match an identifier stored with the media content.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 9, which includes

FIG. 10, which includes

DETAILED DESCRIPTION OF THE PREFERRED EMBODIMENTS

Figure 1:
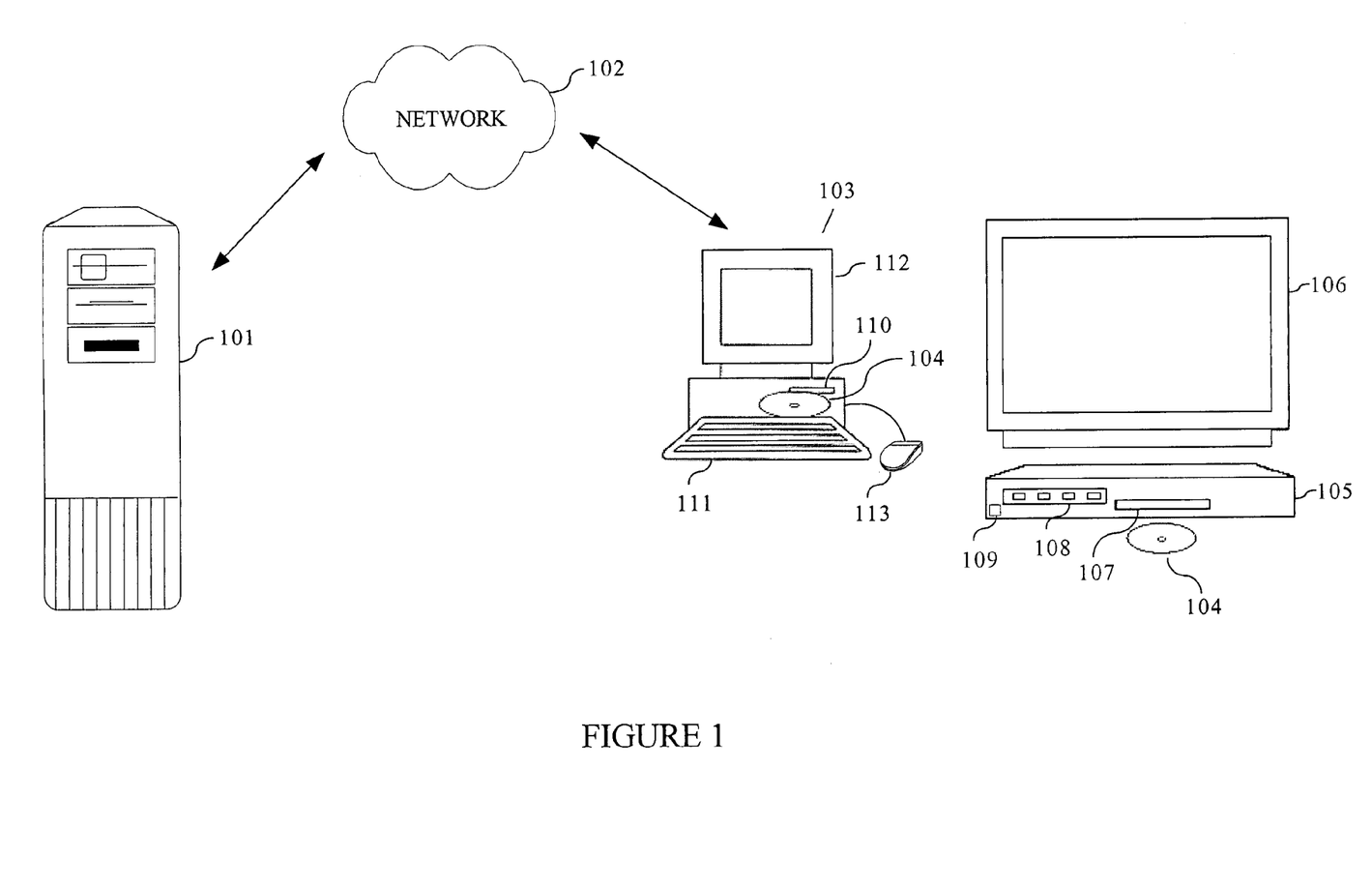
FIG. 1 is a system-level overview illustrating components for use in controlling rights to playback of media content according to one or more embodiments of the present invention.

FIG. 1 is a system-level overview illustrating components for use in controlling rights to playback of media content according to one or more embodiments of the present invention.

The example of FIG. 1 illustrates a system used to download media using a service, such as an on-demand service, provided by server 101 via network 102 (e.g., the Internet). A user accesses the on-demand service to download media content, such as a movie, using computer 103. The downloaded media content is stored on disc 104 (e.g., DVD or CD) for playback on DVD player 105. Although not shown, DVD player 106 is connected to television 105 for playback of the content stored on disc 104.

It should be apparent that the present invention is not limited to playback of movies downloaded from an on-demand service. Another type of media for which playback can be controlled is audio data. For example, the present invention can be used to control playback of music, or music videos. Any type of removable storage may be used with the present invention. Examples of removable storage media include, but is not limited to, DVD, CD, medium capacity removable disk storage system, memory stick, etc.

Computer 103 is likely located in the home of a media content requester, but need not be. Computer 103 includes drive 110, which is capable of reading from and writing to disc 104. In addition, computer 103 includes a keyboard 111, display 112 and mouse 113. Also included with computer 103, but not shown, is fixed disk drive, in which are stored application programs, data files, and device drivers for controlling peripheral devices attached to computer 103, a floppy disk drive for use in reading data from and writing data to floppy disks inserted therein. Data and/or applications may also be accessed from a CD-ROM via a CD-ROM drive (not shown) of computer 103, or over network 102.

The requester uses computer 103 to access server 101 to configure player 105 and to retrieve media content via server 101. In the example of FIG. 1, player 105 is not connected to network 102, or to any other network for that matter. Configuration information and media content is transferred between player 105 and computer 103 via a removable storage medium such as disc 104. Disc 104 is received by player 105 via drive 107, which reads disc 104. Drive 107 may also be configured to write data to disc 104.

Although not shown in FIG. 1, media player 105 can be connected to network 102 or be connected to computer 103 (e.g., via a home network). In addition, information may be transferred by the requester. For example, as is discussed in more detail below, media player 105 outputs registration information which is displayed by television 106. The requester then inputs the displayed registration information into computer 103 (e.g, in an input field of a web page from server 101) for transfer to server 101. If media player 105 is connected to a network, the registration information can be transferred directly from player 105 to computer 103 or server 101.

Media player 105 includes control panel 108 and/or a receiver 107, which receives signals from a remote control device (not shown), to receive input from requester. Media player 105 can display information on television 106, or it can include an integrated display (not shown) for displaying information.

Figure 2:
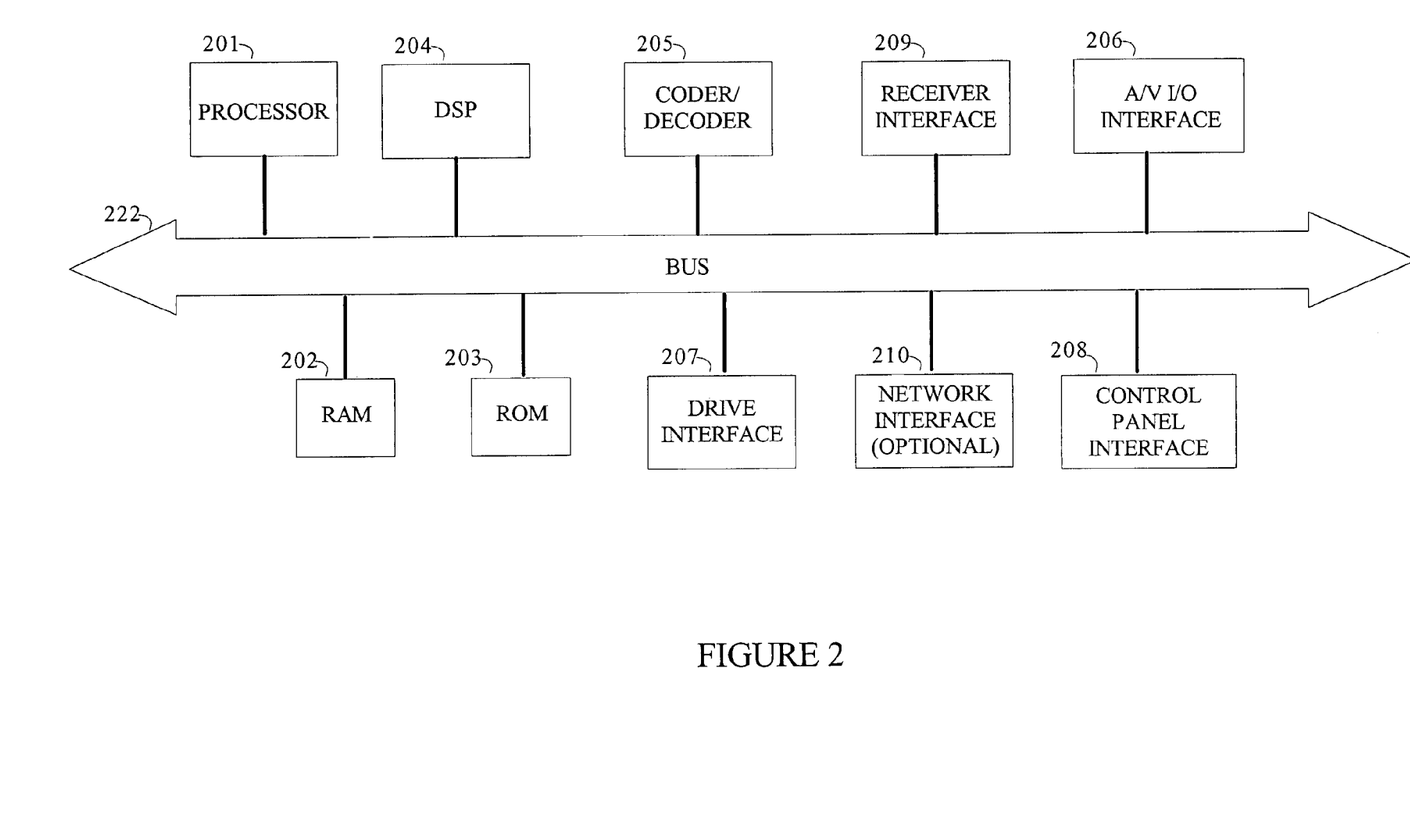
FIG. 2 is a diagram of an internal architecture of a media player for use in conjunction with one or more embodiments of the present invention.

FIG. 2 is a diagram of an internal architecture of a media player, such as player 105, for use in conjunction with the present invention.

Player 105 includes a processor 201, random access memory (RAM) 202, read-only memory (ROM) 203, digital signal processor 204, coder/decoder 205, which are interconnected via bus 222. ROM 203 stores process steps for generating registration information, configuring player 105 and managing information stored by player 105 in RAM 202 to control playback. In addition, player 105 includes interfaces 206 to 209 for interfacing with television 206, drive 107, control panel 108 and receiver 109. Optionally, network interface 210 may be used to connect player 105 to a network, such as a home network and/or network 102.

Figure 3:
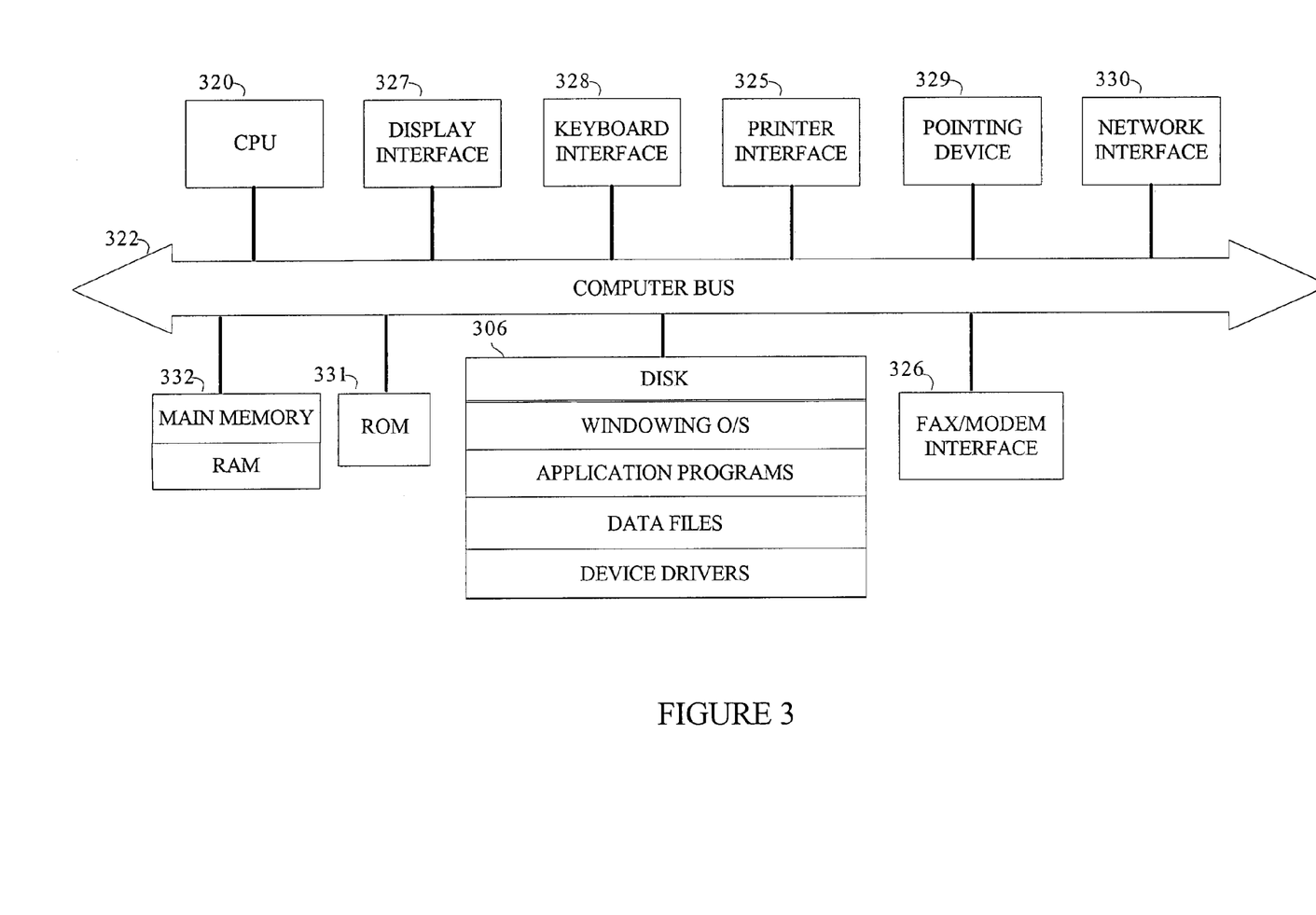
FIG. 3 is a diagram of an internal architecture of a computing system for use in conjunction with one or more embodiments of the present invention.

FIG. 3 is a diagram of an internal architecture of a computing system, such as computer 103 or server 101, for use in conjunction with the present invention.

The computing system shown in FIG. 3 executes a browser-enabled operating system, such as Microsoft Windows® XP. Shown in FIG. 3 are CPU 320, which is preferably a microprocessor such as a Pentium-type microprocessor, interfaced to computer bus 322. Also interfaced to computer bus 322 are printer interface 325, to allow the computing system to communicate with a printing device, modem interface 326 to enable communications between the computing system and its internal modem, display interface 327 for interfacing with a display, keyboard interface 328 for interfacing with a keyboard, mouse interface 329 for interfacing with a mouse, and a network interface 330 for communicating with external devices via a network.

Read only memory (ROM) 331 stores invariant computer-executable process steps for basic system functions such as basic I/O, start up, or reception of keystrokes from the keyboard.

Main random access memory (RAM) 332 provides CPU 320 with memory storage which can be accessed quickly. In this regard, computer-executable process steps (or program module or program code) are transferred from the hard disk 306 over computer bus 322 to RAM 332 and executed there from by CPU 320.

Also shown in FIG. 3 is disk 306 which, as described above, includes a windowing operating system, with browser, and application programs, which may include word processing, spreadsheet, graphics, and the like. Disk 306 further includes data files and device drivers such as those shown.

While other computing systems and internal architectures may be used with the present invention, FIGS. 1 to 3 provide an exemplary representations which can be used to control playback of media content according to embodiments of the present invention.

Figure 4:
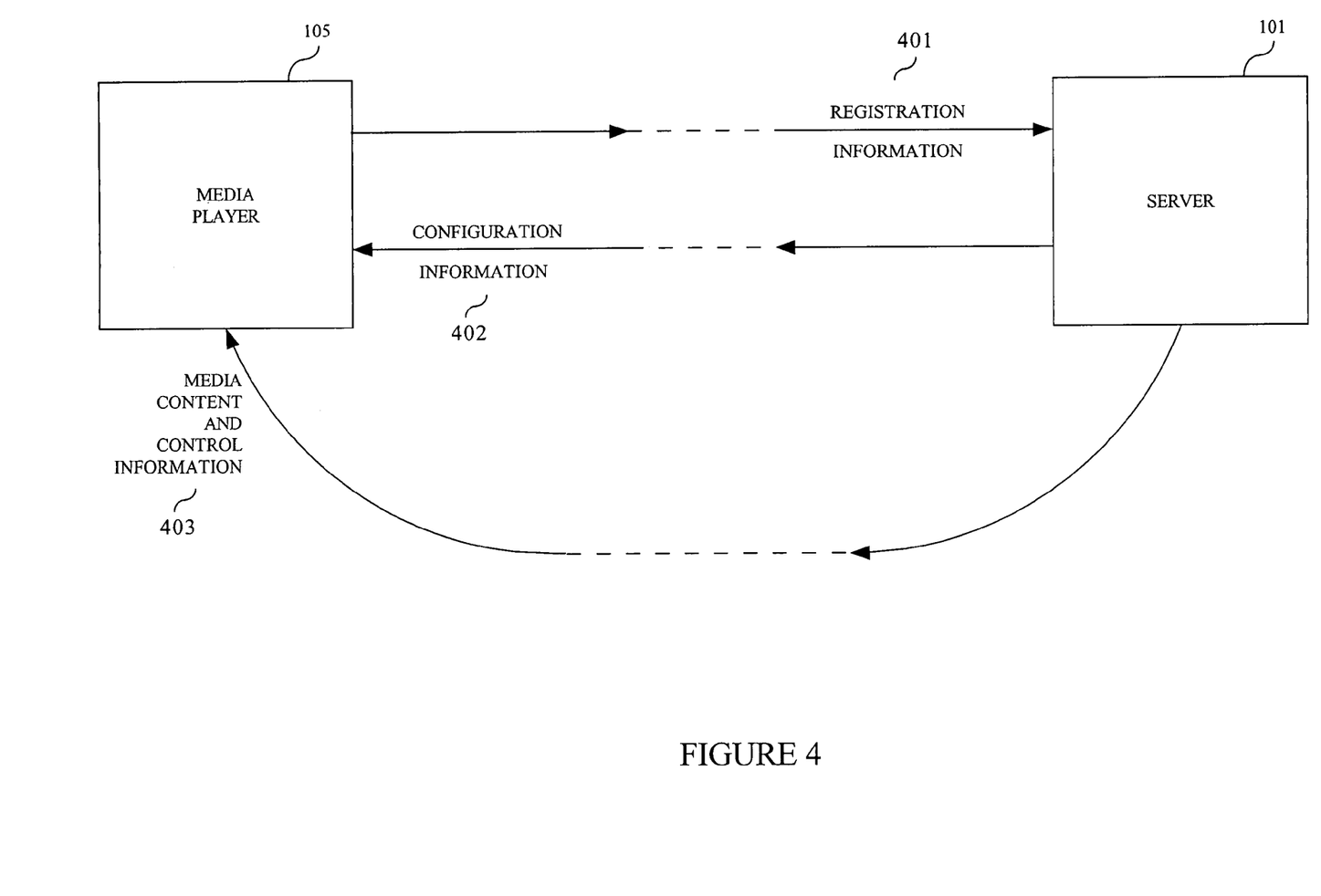
FIG. 4 is a diagram illustrating information for use controlling rights to playback of media content according to one or more embodiments of the invention.

FIG. 4 is a diagram illustrating information flow for use in controlling rights to playback of media content according to one or more embodiments of the invention. While information output by media player 105 can flow directly from media player 105 to server 101, it need not. As discussed above, information (e.g., registration information 401) can be output by media player 105 for display by television 106. The requester reads the displayed registration information and enters it in a input field of a web page displayed by computer 103, which then transmits the input to server 101 via network 102. The web page may be displayed during a registration process undertaken by the requester to use the service provided by server 101, in which the requester might provide information (e.g., requester's name, address, payment information, password, etc.) in addition to the registration information provided by media player 105.

As an alternative to having the requester input the registration information, media player 105 may output the registration information directly to computer 103 or server 101 via a data connection (e.g., wired or wireless network connection, serial connection, etc.). If media player 105 outputs the information to computer 103, it is forwarded to server 101 by computer 103. The data connection may also be used to transfer information from server 101 and/or computer 103 to media player 105.

Information that is to be input to media player 105 may be written to a storage medium by computer 103 or server 101, and the information is retrieved by media player 105 once the storage medium is inserted in a drive of media player 107. Media player 105 could also receive input via a direct connection with computer 103 and/or server 101

Briefly, registration and configuration information is used to configure media player 105 for playback use by a requester of a service (e.g., a video on demand service) of server 105. A configured media player 105 manages and controls playback of media content by media player 105 using information stored in memory of media player 105 and control information associated with the media content.

More particularly, registration information 401 is generated by media player 105 for input to server 101. Registration information 401 is preferably an alphanumeric character string, which is short (e.g., eight characters) in length, since a short character string facilitates transfer by the requester from the display of television 106 to computer 103.

Figure 6:
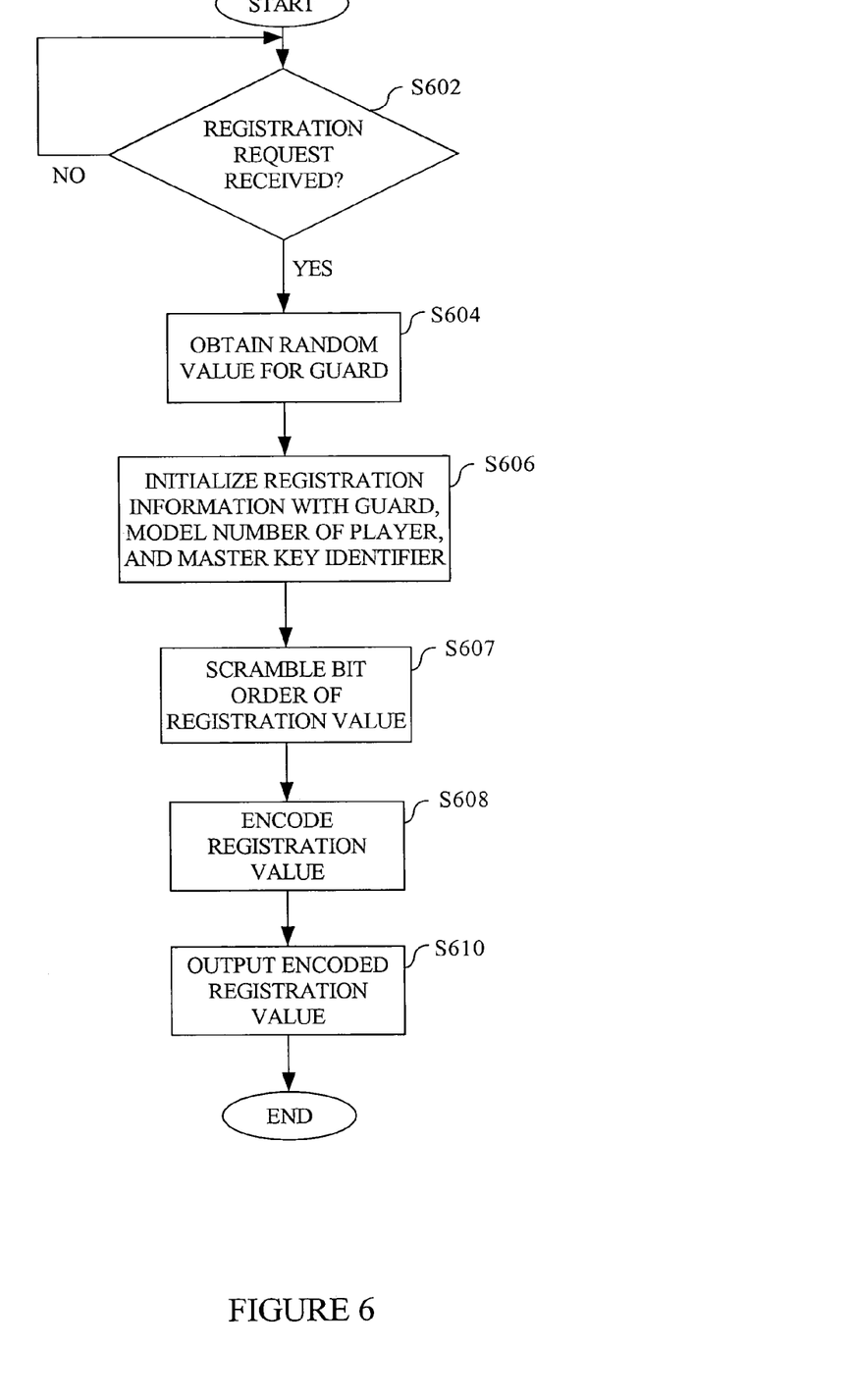
FIG. 6 illustrates a flow diagram of process steps to generate registration information at a media player according to one or more embodiments of the present invention.

FIG. 6 illustrates a flow diagram of process steps performed by media player 105 to generate registration information 401 according to one or more embodiments of the present invention. At step S602, a determination is made whether a registration request has been received. For example, the requester can use control panel 108 or a remote control to invoke one or more menus of the media player 105 to request media player 105 to generate the registration information. If a request is received by the media player 105, processing continues at step S604 to obtain a randomly-generated guard value, which is preferably generated by an event such as when a requester selects a menu item. For example, the guard value may be generated in response to a requester's menu selection selecting a registration operation, or it may be generated sometime prior to such a request being received by media player 105.

Figure 5:
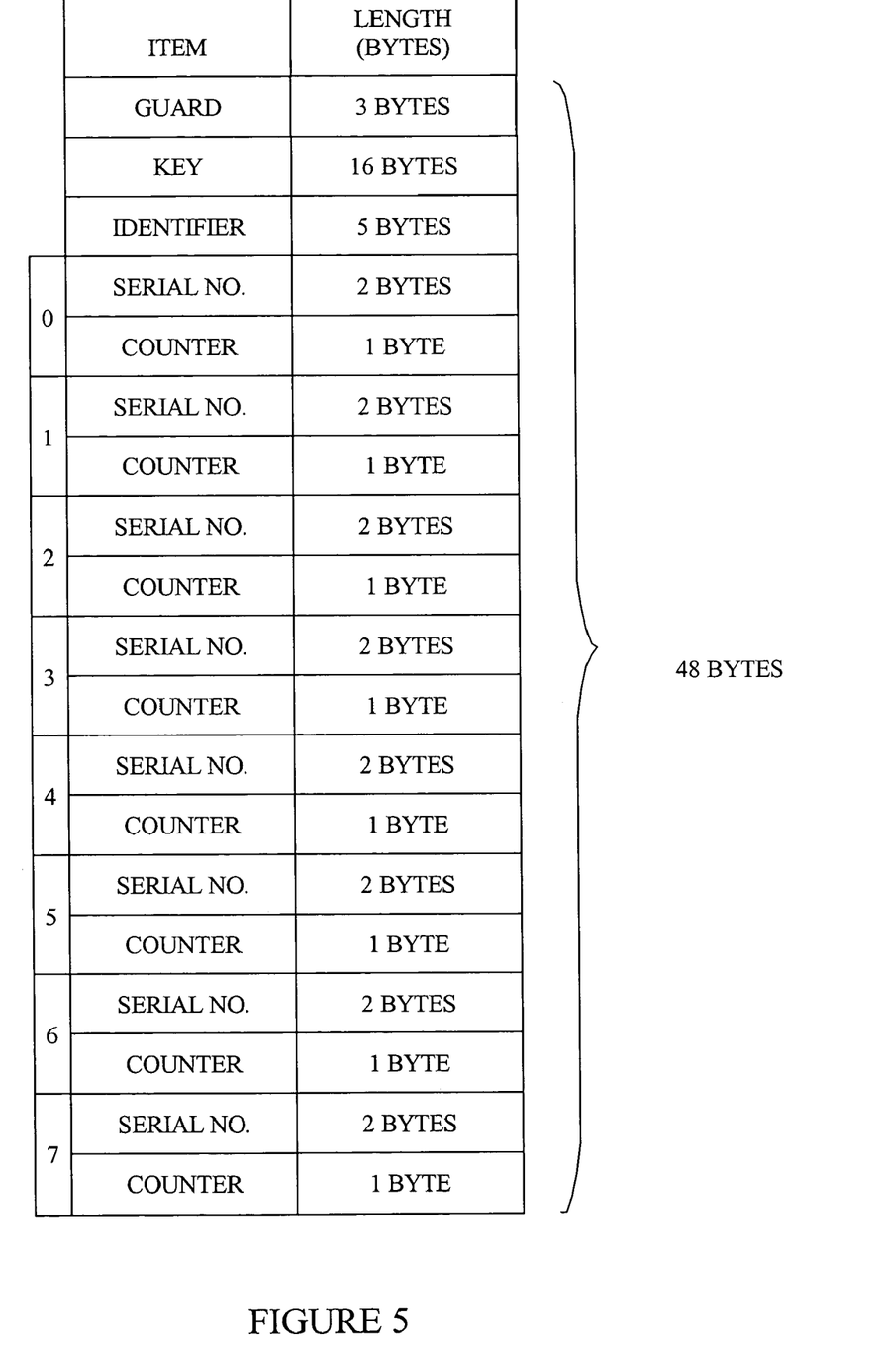
FIG. 5 is a diagram illustrating configuration and control information stored by a media player according to one or more embodiments of the invention.

While the guard value may be of any length, a length of 3 bytes (or 24 bits) is preferably used. According to a preferred embodiment, the configuration and control information stored by media player 105 is shown in FIG. 5. It is preferable to use as little of RAM 202 of media player 105 as possible. As shown in FIG. 5, the configuration and control information stored by media player 105 in RAM 202 for a given requester uses a total of 48 bytes.

At step S606, media player 105 initializes registration information 401 with the generated guard value, a model number associated with the player and an identifier of a master key that is to be used by server 101 to encrypt configuration information 402. Preferably, the resulting registration information 401 is 40 bits in length (i.e., 24-bit guard, 12-bit model number, and 4-bit master key identifier). At step S607, the bits in registration information 401 are scrambled. The registration information is encoded using an encoding scheme, such as base-32 encoding, to encode the 40-bit value into an 8-bit alphanumeric character string at step S608. At step S610, the encoded value of registration information 401 is output by media player 105.

Figure 7:
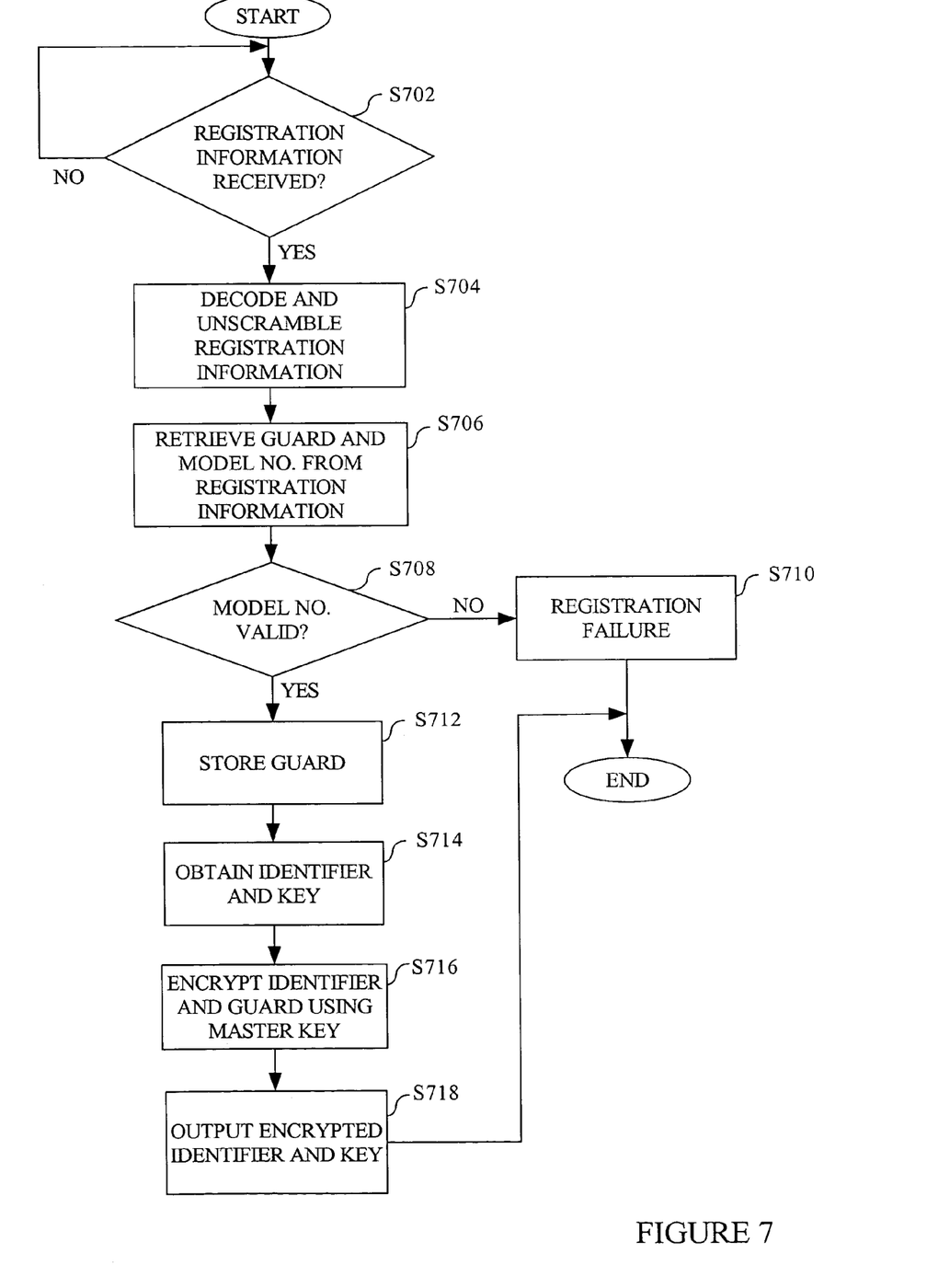
FIG. 7 illustrates a flow diagram of process steps to generate configuration information using registration information output by a media player according to one or more embodiments of the present invention.

Registration information 401 output by media player 105 is used by server 101 to generate configuration information 402. FIG. 7 illustrates a flow diagram of process steps to generate configuration information using registration information output by a media player according to one or more embodiments of the present invention.

At step S702, a determination is made, by server 101, whether registration information 401 has been received. If it has been received, processing continues at step S704, to decode and unscramble the registration information 401. The guard value and model number information are retrieved from registration information 401 at step S706. At step S708, a determination is made whether or not media player 105 is one of a set of media players authorized for use with the system based on the received model number. If not, processing continues at step S710 to process the registration failure.

If the model number retrieved from registration information 401 is determined to be valid, processing continues at step S712 to store the guard in the server's 101 memory. At step S714, an identifier and key for the requester are obtained and, at step S716, they are encrypted using the master key identified by the registration information. At step S718, the encrypted identifier and key are output as configuration information 402 by server 101. For example, the configuration information 402 may be stored on disc 104, by server 101, downloaded to computer 103 for storage on disc 104, or transmitted via a data transfer connection between media player 105 and computer 103 or server 101.

Figure 8:
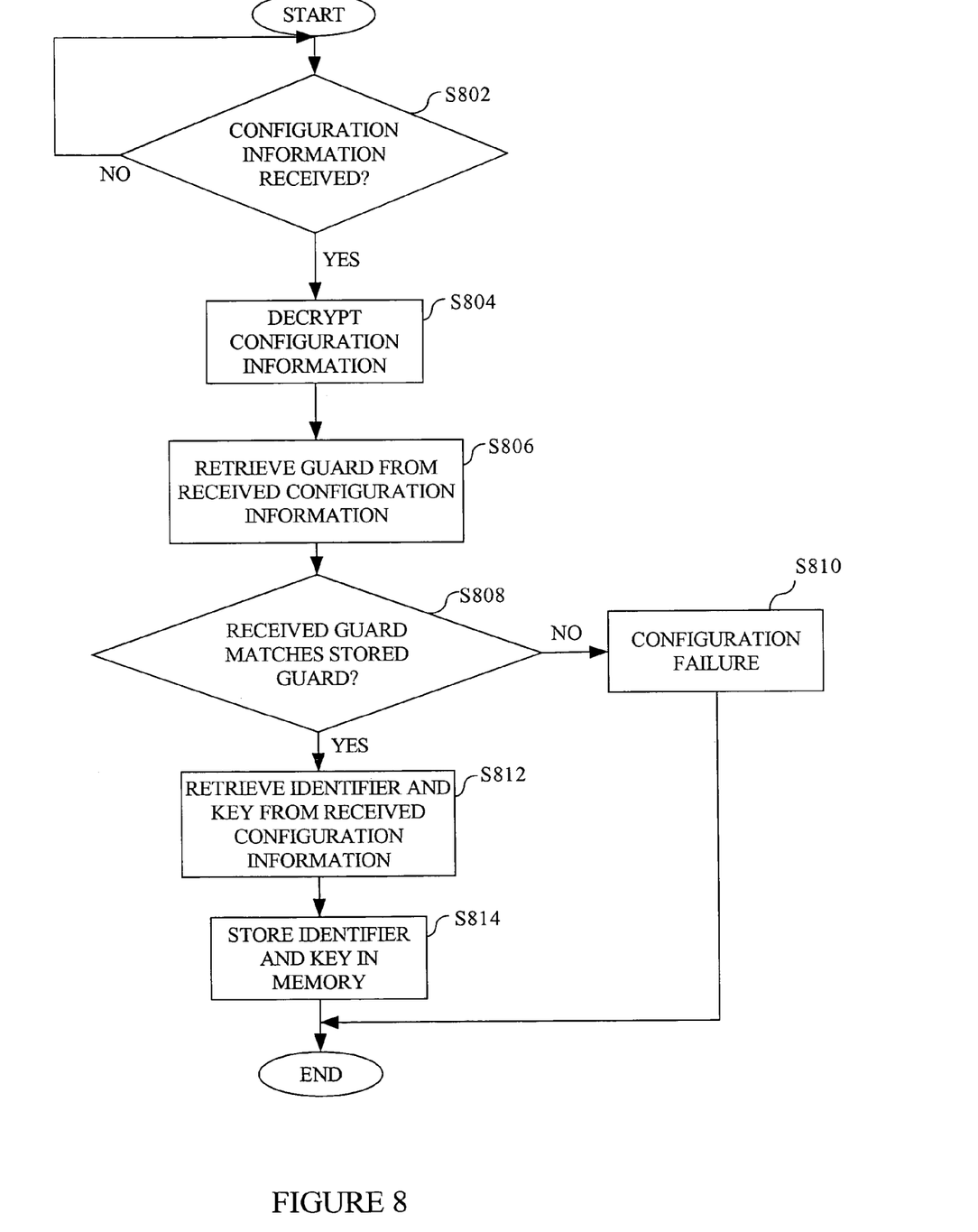
FIG. 8 illustrates a flow diagram of process steps to configure a media player based on received configuration information according to one or more embodiments of the present invention.

Configuration information 402 is used by media player 105 to configure the player for use by the requester to playback media content. FIG. 8 illustrates a flow diagram of process steps to configure media player 105 based on received configuration information according to one or more embodiments of the present invention. At step S802, if media player 105 determines that it has received configuration information 402, processing continues at step S804 to decrypt configuration information 402 using the master key associated with the identifier sent with registration information 401. At step S806, the received guard is retrieved from configuration information 402.

At step S808, the received guard is compared to the guard stored in memory 202 of media player 105. If the received guard and the stored guard are determined to not match, a configuration failure is processed at step S810. If the guards are determined to match, processing continues at step S812 to retrieve the identifier and key from configuration information 402. At step S814, the retrieved identifier and key are stored in memory 202 of media player 105. Referring to FIG. 5, the requester's key is 16 bytes (or 128 bits) in length and the identifier is 5 bytes (or 40 bits).

Referring to FIG. 4, media content and control information (MCCI) 403, is output by server 101 in response to a request for media content by the requester. For example, a requester can access the media content service on server 101 using one or more web pages displayed at computer 103. It should be apparent that MCCI 403 may be sent with configuration information 402, or separately.

FIG. 9 illustrates a flow diagram of process steps to respond to a media content request according to one or more embodiments of the present invention. At step S902, a determination is made that a request for media content was received by server 101. At step S904, processing continues and obtains an identifier and key associated with the requester of media content.

The media content request can be a request to purchase the media or a request to rent the media for a certain number of "playbacks". In the latter case, the number of times the media is played by the requester can be limited by the media player 105 according to the present invention. As is described in more detail below, playback is limited based on a count of the number of times the media content is "played", and based on a serial number associated with the count. Different criteria may be used to define a single play. One example of a criteria used herein to define a playback is each time the media content is decrypted. With this criteria, a single play may involve multiple actual plays.

Referring to FIG. 5, media player 105 has allocated in memory 202 a number of slots (e.g., eight), which are used to store serial number and count information for controlling limited-play media content. The serial number is stored in a slot (e.g., slot number "0") designated by the slot number received in the control information received by media player 105 in MCCI 403. The counter associated with the serial number in the designated slot is initialized to zero, and is updated/incremented with each playback of the corresponding title by media player 105.

Figure 9A:
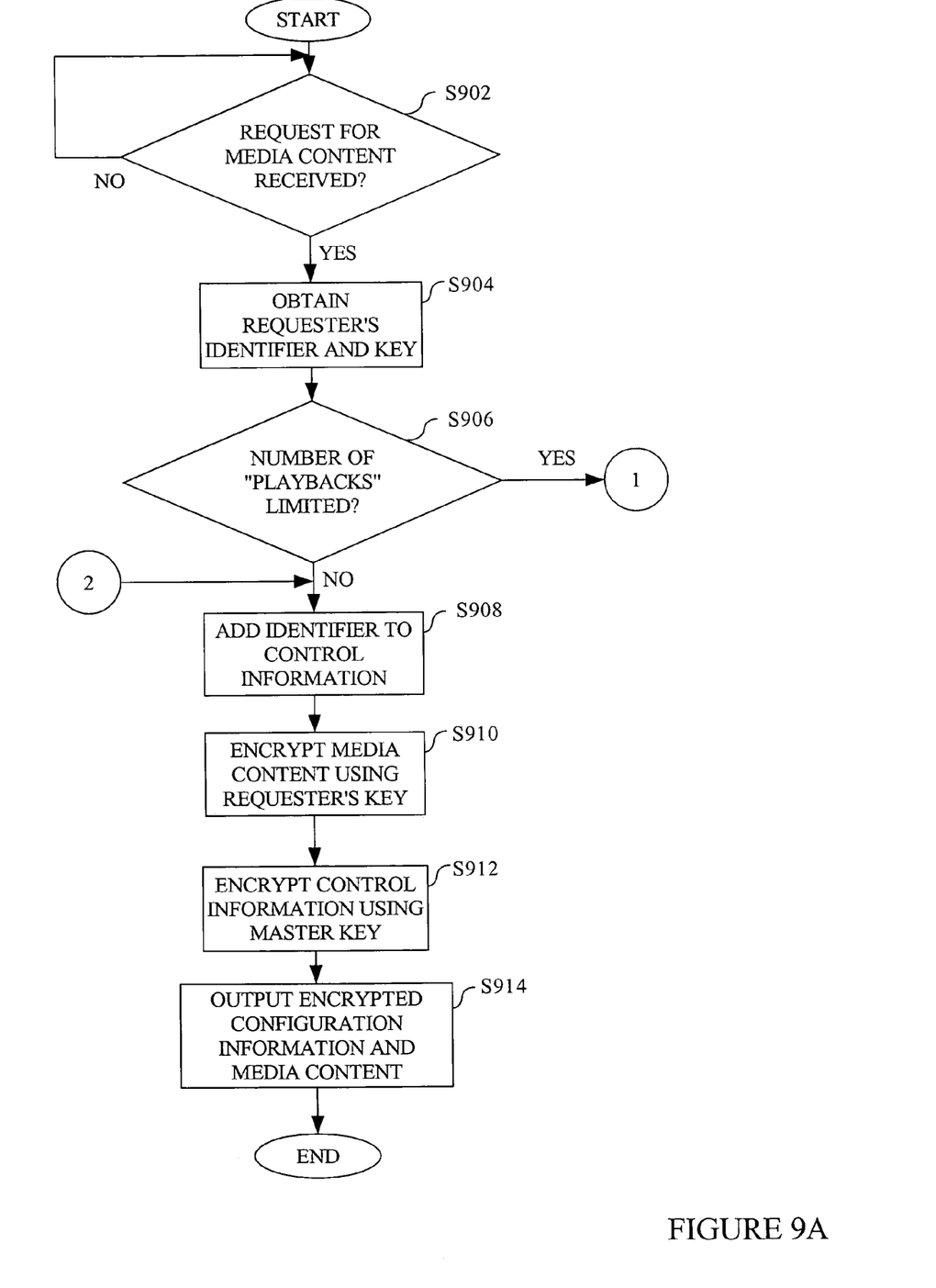
FIGS. 9A and 9B, illustrates a flow diagram of process steps to respond to a media content request according to one or more embodiments of the present invention.

Referring again to FIG. 9, at step S906, a determination is made whether the number of play times is limited. If so, processing continues at step S916 (of FIG. 9B), in which the number of authorized play times is set in the control information. This number can be determined during the request made by the requester, for example.

Figure 9B:
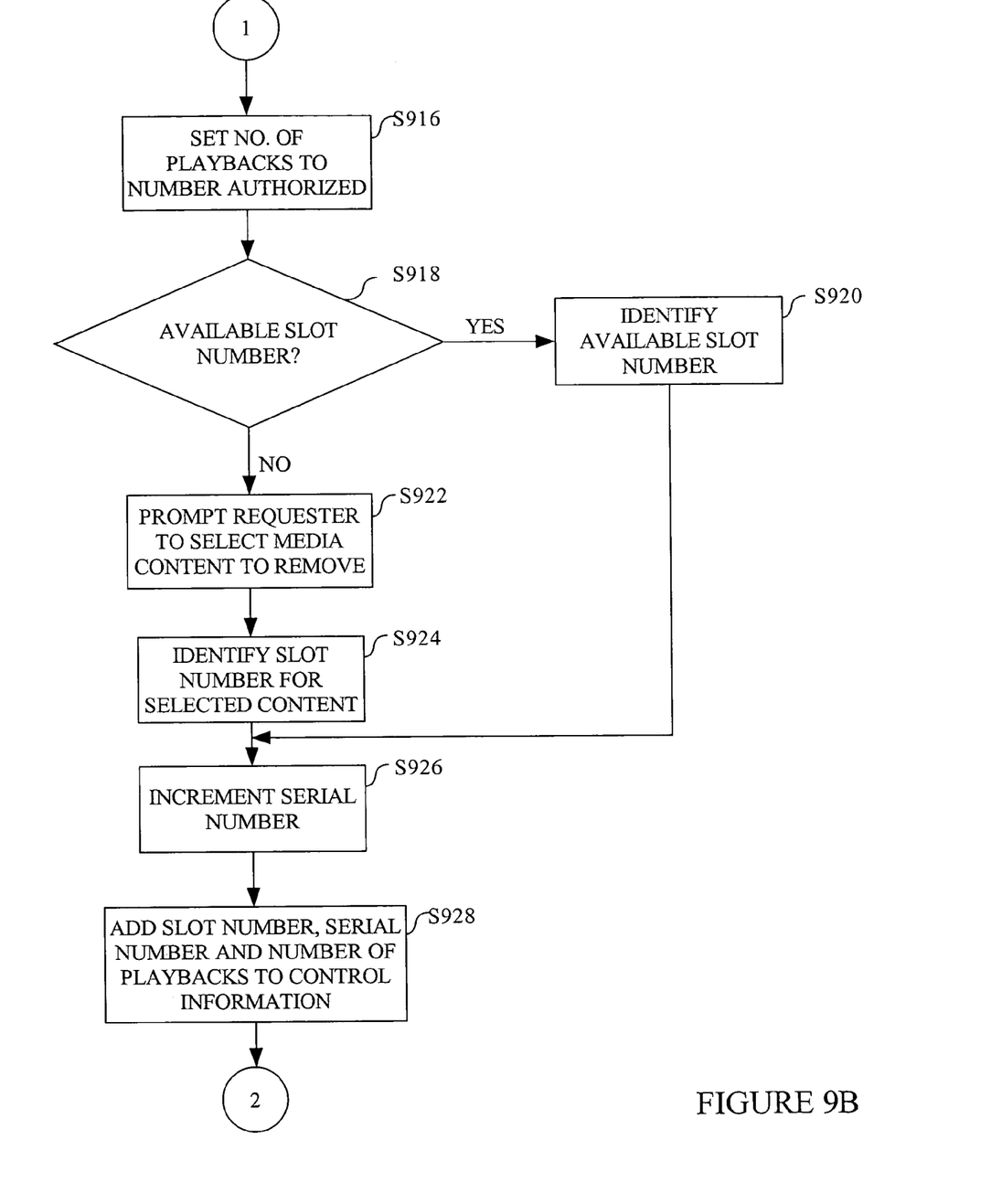

At step S918, a determination is made whether a slot is available in media player 105. This determination can be made by server 101 based on information as to the total number of slots maintained by media player 105 and the media content currently authorized for limited play by the requester. If it is determined that the number authorized does not exceed the number of the media player's 105 slots, processing continues at step S920 to identify the number of an available slot.

If it is determined that the authorized number exceeds the number of media player's 105 slots, processing continues at step S922 to prompt the requester to select one of the media content titles to be removed from playback. At step S924, the slot number associated with the selected media content is identified.

From either of steps S920 and S924, processing continues to identify a serial number for the media content. The serial number is determined from a value that is initialized for the requester at registration/configuration time. The value is incremented each time the requester requests media content. At step S926, the value is incremented, and at step S928 the slot number, serial number and number of authorized plays for the requested media content are stored in the control information. Processing continues at step S908 (of FIG. 9A).

Whether or not the number of plays is limited for the media content, the requester's identifier is added to the control information at step S908, and processing continues at step S910. Using the requester's key, all, or at least some portion, of the media content is encrypted at step S910. The control information is encrypted at step S912 using a master key. At step S914, the encrypted MCCI 403 is output by server 101.

FIG. 10 illustrates a flow diagram of process steps to receive requested media content by the media player according to one or more embodiments of the present invention.

Figure 10A:
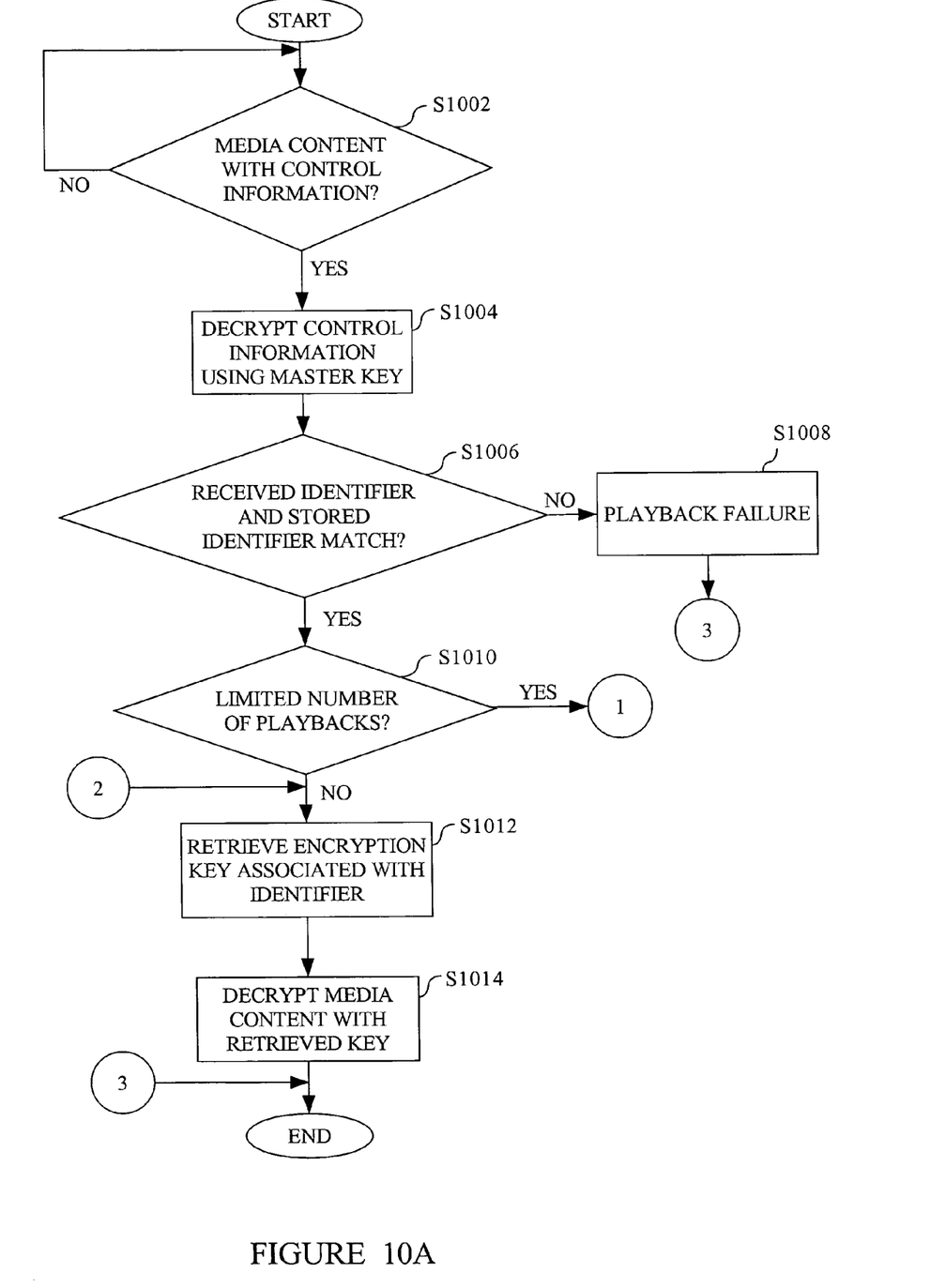
FIGS. 10A and 10B, illustrates a flow diagram of process steps to receive requested media content by the media player according to one or more embodiments of the present invention.

At step S1002, if media player 105 determines that it has received MCCI 403, processing continues at step S1004. The control information from MCCI 403 is decrypted using a master key at step S1004. At step S1006, a determination is made whether the identifier retrieved from the decrypted control information of MCCI 403 matches the requester's identifier stored in media player 105 during configuration. If not, processing continues at step S1008 to process the playback failure. If the identifiers are determined to match, processing continues at step S1010.

At step S1010, a determination is made whether the media content has a limited number of plays. If so, processing continues at step S1022 (of FIG. 10B). At step S1022, the slot number and serial number received in the control information of MCCI 403 are retrieved. At step S1024, the serial number stored in the slot in memory of media player 105 designated by the received slot number is also retrieved. At step S1026, a determination is made whether the received serial number is greater than the stored serial number. If so, it is assumed that MCCI 403 contains new media content, and the received serial number is written S1028 into memory 202 of media player 105 for the slot identified by the received slot number. In addition, the slot's counter is initialized to zero to indicate that the media content has not yet been played by media player 105. Processing continues at step S1032.

Figure 10B:
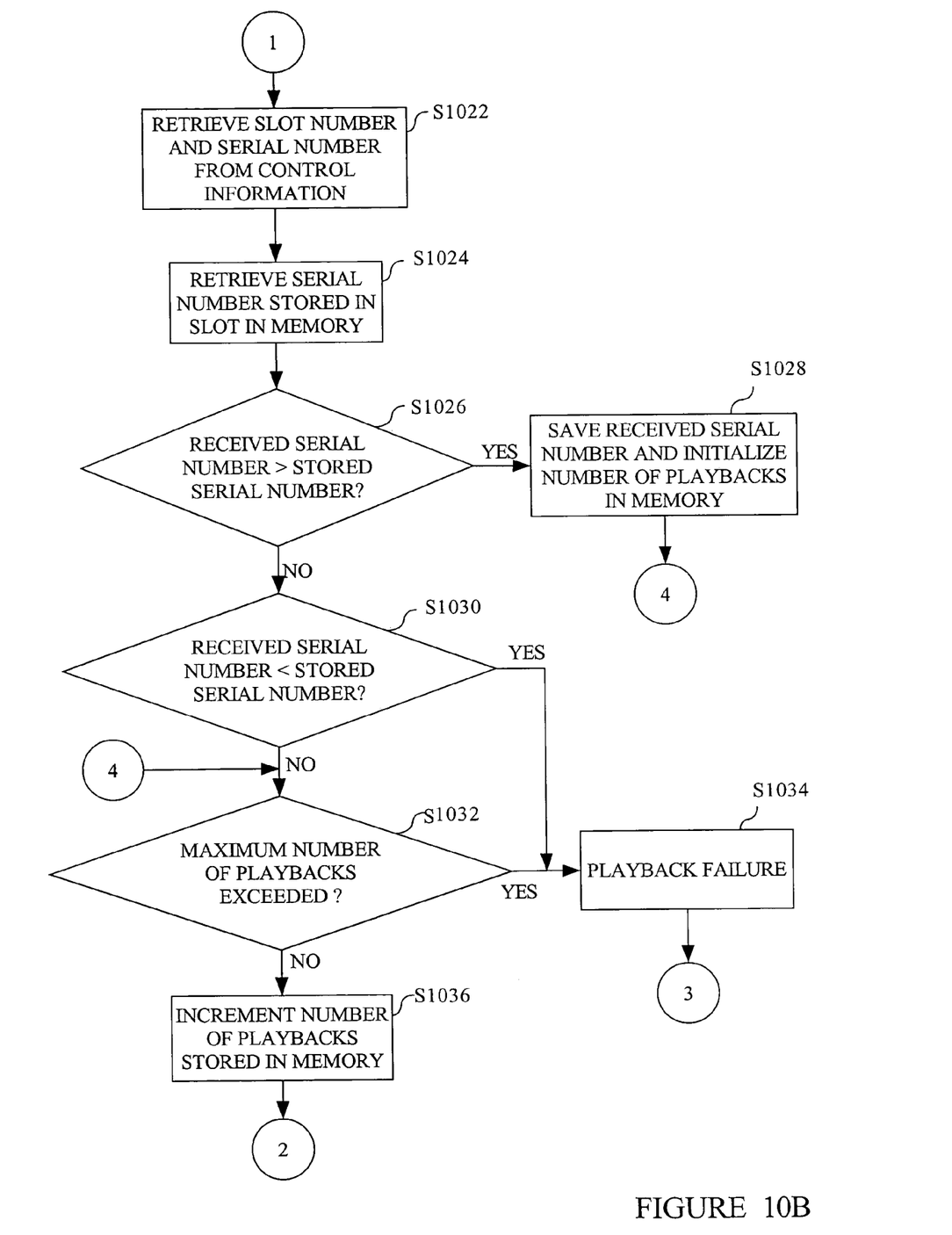

If it is determined, at step S1026, that the received serial number is less than or equal to the stored serial number, processing continues at step S1030 to determine whether the serial number is a valid serial number. If it is determined that the received serial number is less than the stored serial number, it is assumed that the media content is no longer authorized for playback by media player 105, and processing continues at step S1034 to process the playback failure. If the received serial number and stored serial number are determined to match, processing continues at step S1032.

At step S1032, a determination is made whether the maximum authorized number of plays has been exceeded by comparing the stored counter value and the number of plays authorized by the received control information. If the stored counter value exceeds the authorized number of plays, processing continues at step S1034 to process the playback failure. If it is determined that the authorized number of playbacks is not exceeded, processing continues at step S1038 to increment the stored counter in memory 202 of media player 105, and processing continues at step S1012 (of FIG. 10A).

Whether or not the number of plays is limited for the media content, the requester's key is retrieved at step S1012, and processing continues at step S1014 to decrypt the encrypted media content portion of MCCI 403 using the requester's key.

According to the present invention, multiple media players 105 can be configured for a given requester such that media content requested by the requester may be played on each media player 105. To illustrate, each media player 105 provides registration information 401 and is configured using configuration information 402 generated using the registration information 401 provided by the media player 105. Thus, a requester is able to playback media content using different media players 105.

In addition, a media player 105 can be configured for use by multiple requesters, with the media player 105 storing configuration and control information, as shown in FIG. 5, for each requester. Media player 105 provides registration information 401 for each requester and is configured using the configuration information 402 generated from the registration information 401.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method for configuring a media player to manage rights to playback of media content, the media player possessing a plurality of master keys, the method comprising:
   randomly generating and storing a guard;
   providing registration information including the stored guard and an identifier of a master key, the registration information for use in generating configuration information and for selecting a key used to encrypt the configuration information;
   receiving the encrypted configuration information, which includes a guard, an encryption key and an associated identifier identifying the encryption key;
   decrypting the encrypted configuration information using one of the stored plurality of master keys indicated by the identifier of a master key; and
   storing the encryption key and the associated identifier in memory of the player in a case that the received guard is determined to match the stored guard.

2. A method according to claim 1, wherein the player displays the registration information on a television monitor.

3. A method according to claim 1, wherein the registration information is encoded as an alphanumeric character string.

4. A method according to claim 1, wherein the encryption key and associated identifier are associated with a user of the player.

5. A method according to claim 1, wherein the stored guard is reset with a randomly-generated value for another configuration use.

6. A method of claim 1, further comprising:
   receiving a request from a user for media content;
   retrieving from memory of a server a user encryption key and associated identifier;
   encrypting the media content using the user encryption key and storing the associated identifier with the encrypted media content; and
   outputting the encrypted media content and the identifier in an electronic format to the user for input to the player.

7. A method according to claim 6, wherein the electronic formation is a file which is output for storage on a removable storage medium.

8. A method according to claim 6 wherein a serial number and number of authorized views are output with the media content.

9. A method of managing rights to playback of media content by a media player which stores a known encryption key and a known identifier associated with the encryption key, where the media content is encrypted using the known encryption key and the identifier is stored with the media content, the method comprising:
   receiving encrypted media content and an identifier stored with the encrypted media content;
   retrieving from memory of the media player an encryption key having an associated identifier matching the received identifier; and
   decrypting the media content using the retrieved encryption key;
   wherein, in addition to the received identifier, a serial number and an authorized number of views are received with the media content;
   wherein the received serial number and a corresponding number of views initialized to zero are stored in the player's memory;
   wherein the received serial number is determined to be greater than a value stored in the player memory, and where stored value is overwritten by the received value.

10. A method according to claim 9, wherein the player has a stored number of views associated with the media content, the method further comprising the steps of:
    comparing the stored number of views to the authorized number of views; and
    performing the step of decrypting the media content in a case that the stored number of views does not exceed the authorized number of views.

11. A method according to claim 10, further comprising the step of incrementing the stored number of views in a case that the step of decrypting the media content is performed.

12. A method according to claim 10, wherein a serial number associated with the stored number of views is stored in the player's memory, the method further comprising the steps of:
    comparing the serial number stored in the player's memory with the serial number received with the media content; and
    performing the step of decrypting the media content in a case that the serial numbers match and the stored number of views does not exceed the authorized number of views.

13. A method according to claim 12, wherein the player overwrites one of the memory slots to store the serial number and authorized number of views pair for the media content.

14. A method according to claim 13, wherein the memory slot that is overwritten is determined based on user input.

15. A method according to claim 9, wherein the player's memory has a number of memory slots each of which is used to store a serial number and authorized number of views.

16. A method according to claim 15, wherein the identifier, a slot identification and the serial number uniquely identifies allowed playback of the media content.

17. A method for configuring a media player, comprising:
    randomly generating and storing a guard;
    providing registration information for use in generating configuration information, the registration information including the stored guard;
    receiving the configuration information which includes a guard, an encryption key and an associated identifier identifying the encryption key, the encryption key and the associated identifier are stored in the media player's memory in a case that the received guard matches the stored guard;
    receiving encrypted media content and an accompanying encryption key identifier;
    retrieving from the player's memory an encryption key for use in decrypting the media content, the retrieved encryption key having an associated identifier determined to match the identifier accompanying the media content.

18. A method for use by a server, to generate information used in configuring a media player to manage rights to playback of media content, the media player randomly-generating and pre-storing a stored guard and pre-storing a plurality of master keys, the method comprising:

receiving registration information from a user, the registration information, which includes the stored guard and an identifier of a master key, is for use in generating configuration information;

selecting an encryption key and an associated identifier;

encrypting the encryption key and the associated identifier using the master key indicated by the identifier of a master key; and outputting the encrypted configuration information comprising the encryption key, the associated identifier and the stored guard in an electronic format to the user for input to the player.

19. A method according to claim 18, wherein the electronic format is a file which is output for storage on a removable storage medium.

20. A computer-readable memory medium in which computer-executable process steps are stored, the process steps for performing a method according to any of claims 1 to 8.

21. Computer-executable program code stored on a computer readable medium, said computer-executable program code for performing a method according to any of claims 1 to 8.

* * * * *